Nov. 25, 1924.

O. G. BLOOM 1,517,146

BICYCLE SHOCK ABSORBER

Filed Feb. 4, 1924

O. G. Bloom
INVENTOR

BY Victor J. Evans
ATTORNEY

WITNESS:

Nov. 25, 1924.
O. G. BLOOM
1,517,146
BICYCLE SHOCK ABSORBER
Filed Feb. 4, 1924
2 Sheets-Sheet 2
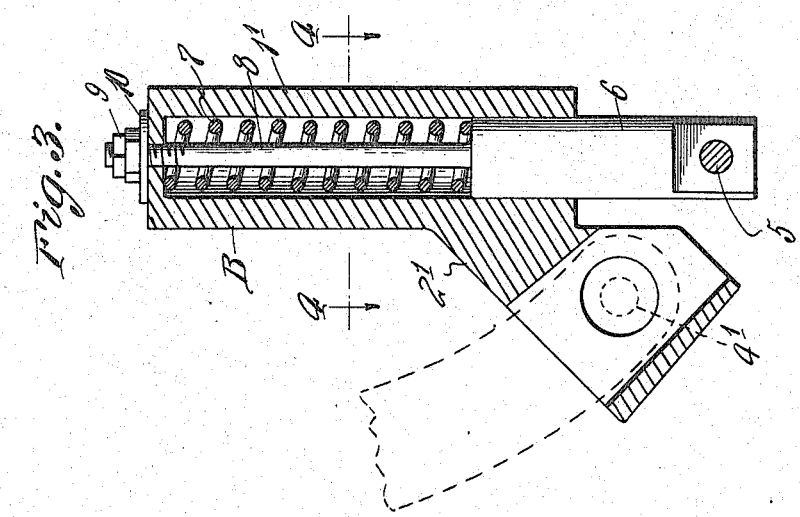
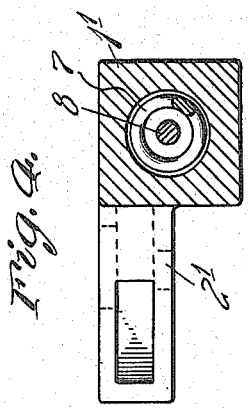
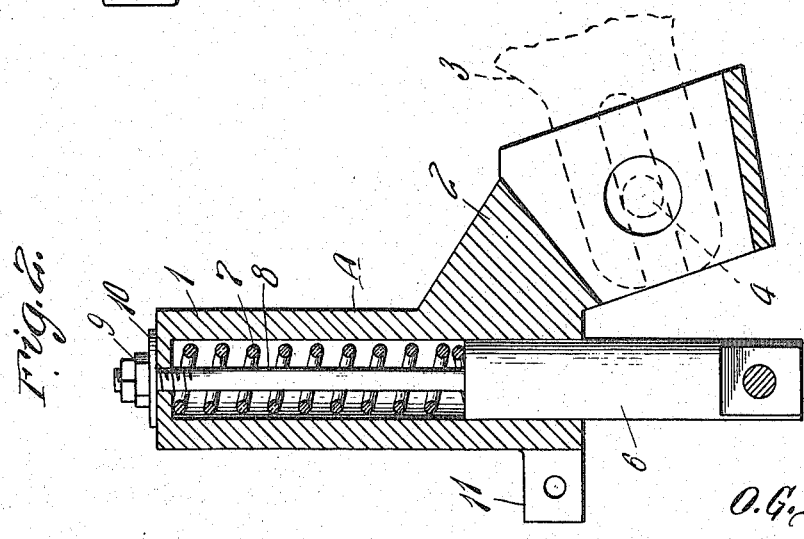

UNITED STATES PATENT OFFICE.

OTTIS G. BLOOM, OF WILKES-BARRE, PENNSYLVANIA.

BICYCLE SHOCK ABSORBER.

Application filed February 4, 1924. Serial No. 690,629.

*To all whom it may concern:*

Be it known that I, OTTIS G. BLOOM, a citizen of the United States, residing at Wilkes-Barre, in the county of Luzerne and State of Pennsylvania, have invented new and useful Improvements in Bicycle Shock Absorbers, of which the following is a specification.

This invention relates to shock absorbers for bicycles and the like, the present invention being an improvement over that shown in my Patent No. 1,475,044, dated Nov. 20, 1923.

One of the objects of this invention is to simplify the construction and to provide means whereby the tension of the springs can be adjusted.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 2 is a longitudinal sectional view through one of the attachments for the rear wheel.

Figure 3 is a similar view of one of the attachments for the front wheel.

Figure 4 is a section on line 4—4 of Figure 3.

Figure 1:
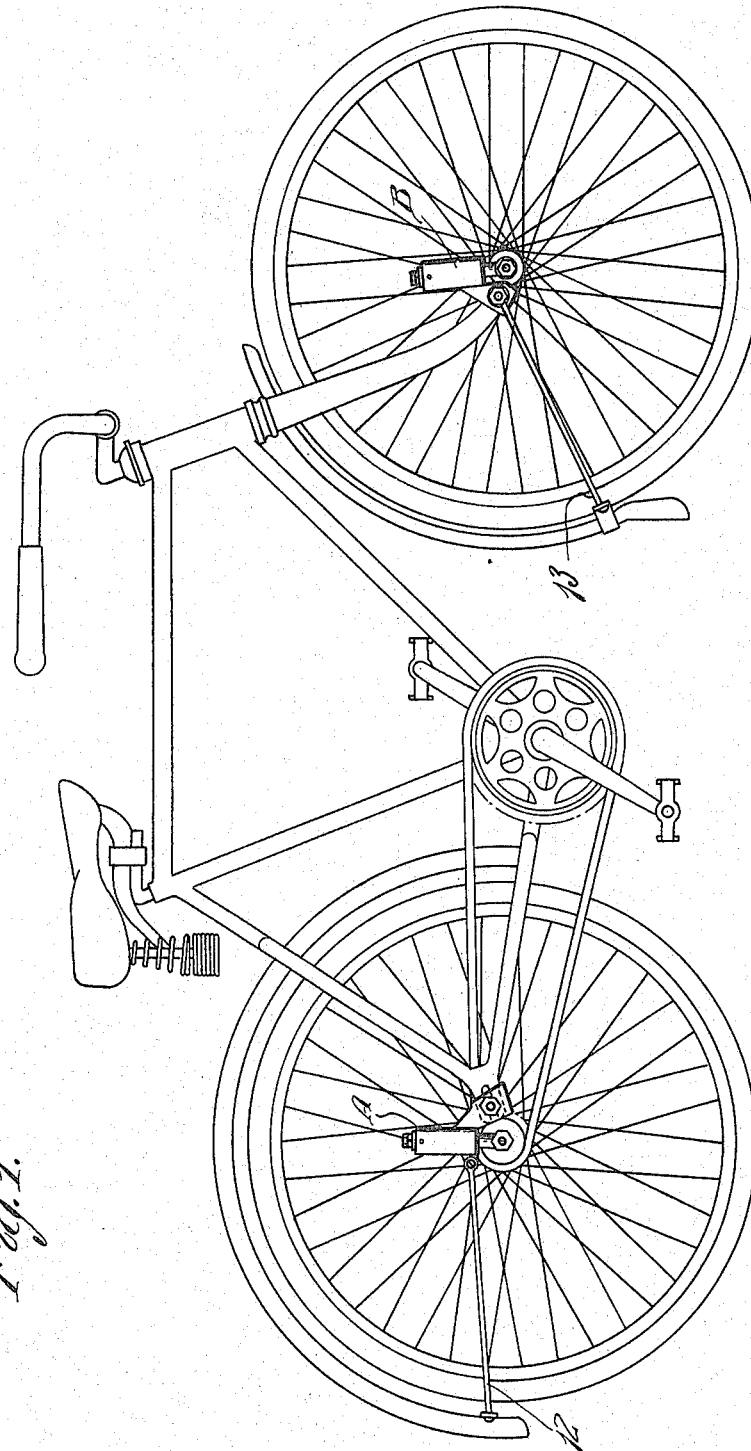
Figure 1 is a view of a bicycle showing my invention in use.

As shown in these views, I provide a pair of attachments A for the rear wheel and a pair B for the front wheel. Each rear attachment consists of a body which is formed with a cylinder 1 and a socketed extension 2 to receive the forked part 3 of the bicycle frame. This socketed part is adjustably connected with the frame by means of the bolt 4 which passes through the socketed part and between the prongs of the forked parts of the frame. Each of the members B is also provided with a piston 1' and a socket 2' which receives one of the prongs of the steering fork of the bicycle, the prongs being being fastened to the socket part by the bolts 4'. The shafts 5 for the front and rear wheels are carried by the pistons 6 which are placed in the cylinders of the members A and B and these pistons are normally held in their lowest position by the springs 7 in the cylinders engaging the pistons. Each piston is provided with a stem 8 which passes through the spring and through the upper closed end of the cylinder where it receives the nuts 9 and the washer 10. This arrangement of parts limits the movement of the piston and also provides means for adjusting the tension of the spring within the cylinder. I prefer to make the cylinders of rectangular shape in cross section, as shown in Figure 4, and to form the socketed parts integral with the cylinders. This reduces the cost of manufacture and strengthens the attachments.

From the foregoing it will be seen that the attachments will act as shock absorbers to prevent shocks being communicated to the rider.

The rear attachment A is provided with a perforated ear 11 so that the brace 12 for the rear mud-guard can be fastened to the attachment while the brace 13 for the front mud-guard is engaged by the bolt 4'.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A shock absorber of the character described comprising a cylinder, an annular extension at the lower end of the cylinder formed with a socket to receive a prong of a bicycle frame, a piston in the cylinder and having a stem passing through the upper end of the cylinder, the upper end of the stem being threaded, a nut on said threaded end, a spring in the cylinder for holding the piston in its lowest position and the lower end of the piston having an opening therein for receiving the axle of a bicycle and a perforated ear on the cylinder for receiving a brace of the bicycle.

In testimony whereof I affix my signature.

OTTIS G. BLOOM.